May 22, 1923.
J. G. VINCENT
1,456,201
AUXILIARY PUMP FOR MOTOR VEHICLES
Original Filed Jan. 31, 1916
3 Sheets-Sheet 1

INVENTOR
Jesse G. Vincent,
BY Foster, Freeman,
Watson & Coit,
ATTORNEYS.

May 22, 1923.

J. G. VINCENT 1,456,201

AUXILIARY PUMP FOR MOTOR VEHICLES

Original Filed Jan. 31, 1916    3 Sheets-Sheet 2

INVENTOR
Jesse G. Vincent,
BY Foster, Freeman,
Watson & Coit,
ATTORNEYS.

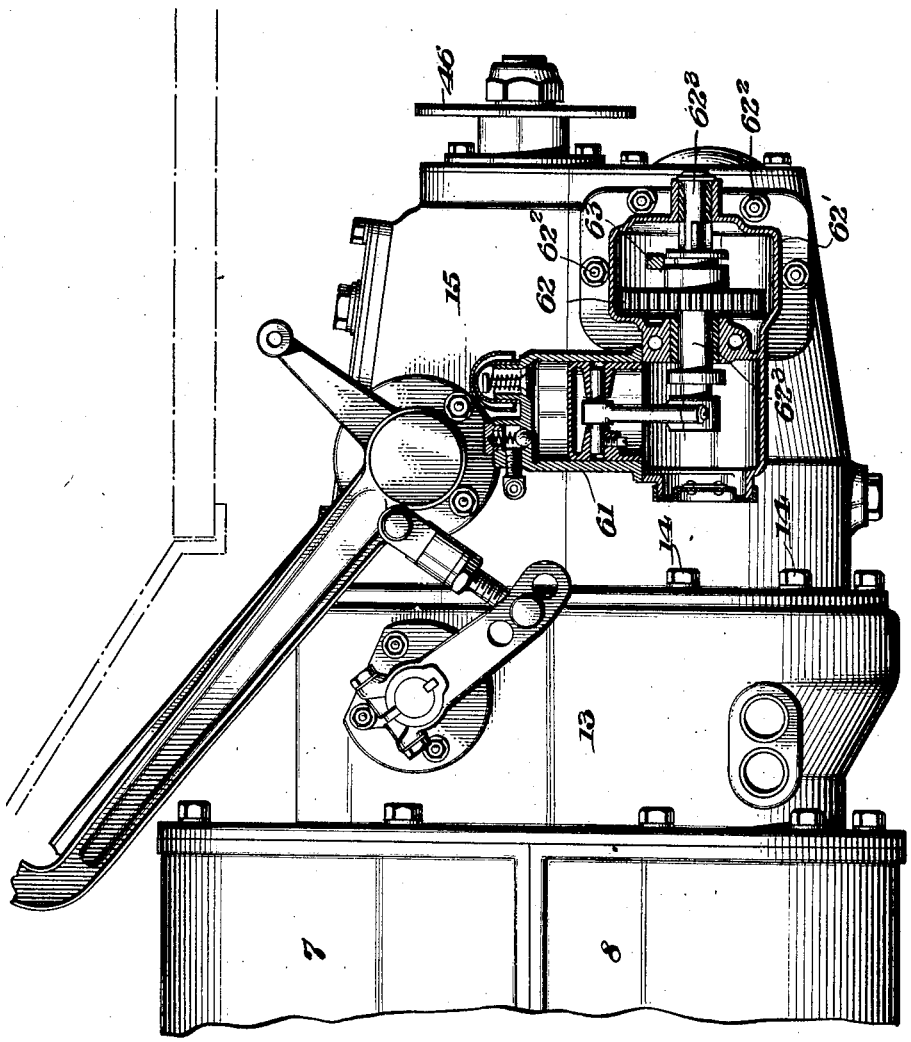

Patented May 22, 1923.

1,456,201

UNITED STATES PATENT OFFICE.

JESSE G. VINCENT, OF DETROIT, MICHIGAN, ASSIGNOR, BY MESNE ASSIGNMENTS, TO KELLOGG MANUFACTURING COMPANY, OF ROCHESTER, NEW YORK, A CORPORATION OF NEW YORK.

AUXILIARY PUMP FOR MOTOR VEHICLES.

Original application filed January 31, 1916, Serial No. 75,414. Divided and this application filed November 27, 1918. Serial No. 264,435.

*To all whom it may concern:*

Be it known that I, JESSE G. VINCENT, a citizen of the United States, and residing at Detroit, county of Wayne, and State of Michigan, have invented certain new and useful Improvements in Auxiliary Pumps for Motor Vehicles, of which the following is a specification.

The present application which is a division of my application Serial No. 75,414 filed January 31, 1916 patented March 18, 1919 No. 1,297,755 relates to motor vehicles and more particularly to the construction, mounting, arrangement, and drive of an auxiliary pump for use on motor vehicles.

Heretofore it has been the practice to equip some motor vehicles with air pumps for inflating the tires. These pumps, however, have been mounted or driven in more or less of a makeshift manner. Usually the pump has been mounted on the side of the motor and driven from the water pump or generator shaft by means of gears. In this form of drive the gears were exposed and the pump or generator shaft subjected to the additional strains due to driving the air pump. It is the object of the present invention to overcome these defects. To this end the air pump is rigidly secured to a part of the motor vehicle and driven from a shaft amply strong to withstand the work of operating the pump. Furthermore, the gears for driving the pump are enclosed and run in a lubricant. As shown, the pump is mounted on the side of the transmission casing and has a shiftable gear connection with the transmission.

Figure 1:
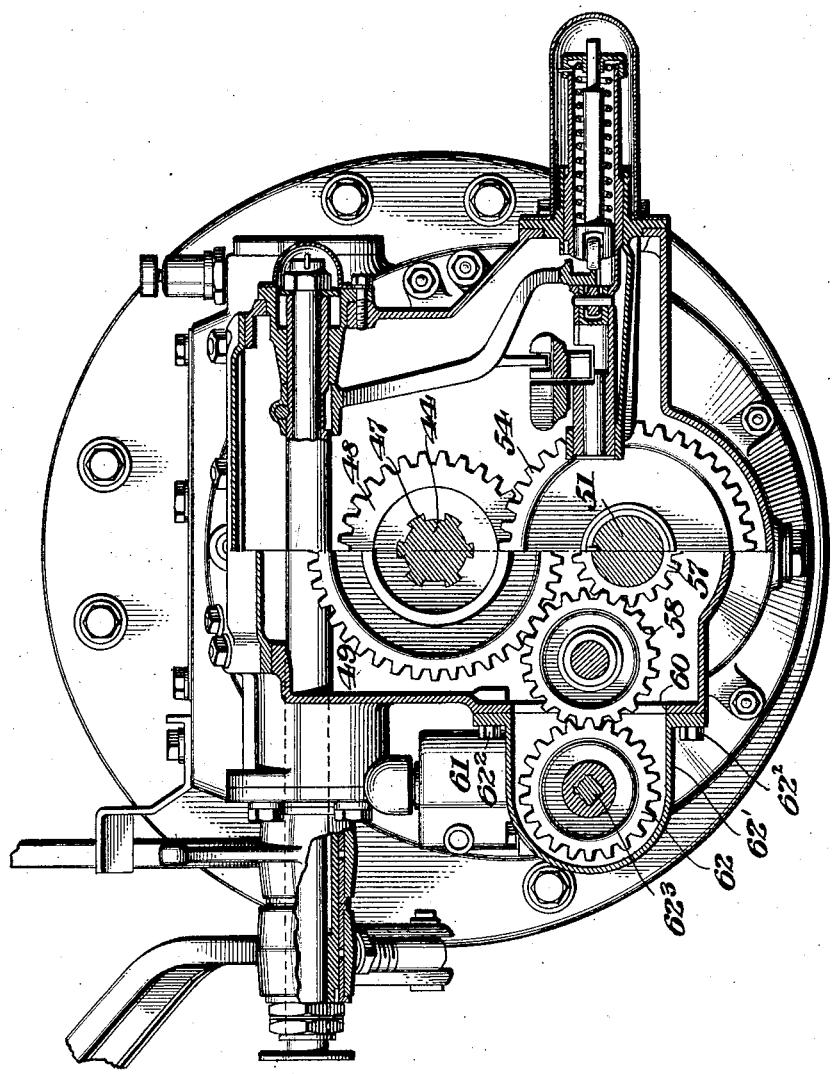
Figure 2:
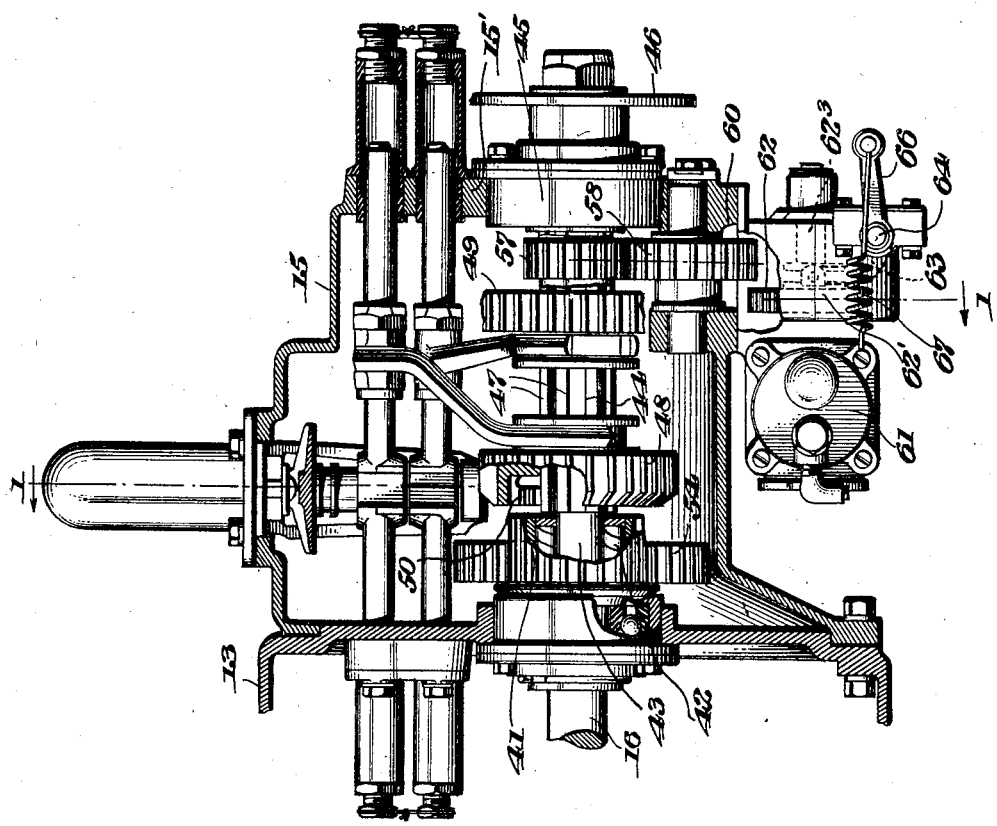

The novel arrangement and preferred embodiment will be apparent from the description taken in connection with the drawings in which Fig. 1 is a transverse sectional elevation through a transmission taken substantially on the line 1—1 of Fig. 2 and illustrating an air pump secured to the transmission casing in accordance with the present invention:

Fig. 2 is a plan sectional view through the transmission casing illustrating the gear drive for operating the pump: and Fig. 3 is a side elevation of a portion of the vehicle motor and transmission, the air pump being shown in section.

Referring to the drawings the rear part of the vehicle motor as shown in Fig. 3 includes the upper and lower detachable halves 7 and 8 of the crank case which carry the clutch casing 13. A gear or transmission casing 15 is secured to the clutch casing as by means of bolts 14.

The arrangement of the gearing within the transmission casing may be as desired. In the embodiment illustrated in the drawings, the rearward end of the clutch shaft 16 is enlarged within the casing 15 and provided with gear teeth 41 on the exterior of the enlargement. The enlarged end is cupped out to receive a bearing 42 which supports the end 43 of the transmission drive shaft 44, the rearward end of this shaft being supported in a bearing 45 in the rear wall 15 of the transmission casing. On the exterior of the casing the shaft 44 is provided with a flange 46 to which a universal joint or other similar form of connection may be attached. The shaft 44 is preferably provided with a plurality of keys 47 and has slidably arranged thereon gears 48 and 49. The gear 48 has internal teeth 50 adapted to mesh with the teeth 41 to form a direct connection for the shafts 16 and 44. A countershaft 51 is mounted in bearings in the casing and has keyed thereon the gear 54 which constantly meshes with the teeth 41. The shaft 51 also has keyed thereon other gears adapted to be engaged by the sliding gears 48 and 49. A gear 57 is also secured to this countershaft for the purpose of driving the air pump.

According to the present invention the pump 61 is secured to the side of the casing, which is formed with an aperture 60 through which the gear 58 slightly projects and meshes with a shiftable gear 62 arranged within a casing 62' attached to the pump and secured to the transmission casing as by means of bolts 62². The gear 58 is in mesh with the gear 57 on the transmission counter shaft and consequently gear 62 is rotated when the counter shaft revolves. This latter gear is splined on the pump crank shaft 62³ so that it may be shifted into and out of mesh with the gear 58. As shown, the mechanism for thus sliding the gear 62 comprises an arm 63, which is secured on the vertical shaft 64 projecting upward through the casing 62'. At its upper end exterior of the casing the shaft carries an arm 66 with which a spring 67 is connected, as clearly shown in Fig. 2. The arrangement of the spring and the axis of shaft 64 is such that when the arm 66 is swung upward as viewed in said figure, the pull of the spring will automatically continue the shifting movement and hold the gear 62 out of mesh from the gear 58. In a similar manner if the arm 66 is swung downwardly, as the axis of the spring 67 passes below the axis of shaft 64, the tension of the spring will exert a pull to swing the arm 66 thereby causing the engagement of gear 62 with gear 58 and holding said gears in mesh.

From the foregoing description it will be seen that the pump is secured to the motor vehicle in a very rigid manner and furthermore the gear drive is entirely enclosed and as the pump gear casing is in communication with the transmission casing, the pump driving gears will be thoroughly lubricated from the lubricant within the transmission casing.

It will also be seen that by mounting the pump on the side of the transmission casing ample space is available below the floor of the car for the mounting of the pump in substantially vertical position if desired and also to render the pump readily accessible for inspection and repair and for the attachment of the air pipe. The mounting of the pump is also such that it in no way interferes with opening of the transmission casing for filling it with grease. The location of the pump shaft outside of the confines of the transmission casing renders possible a firm mounting of the shaft directly in the pump casing and permits of the substantially vertical mounting of the pump in desired cases and also permits of the provision of the pump gear case freely communicating with the transmission casing while the remainder of the pump is protected from an excess of lubricant, thereby insuring the passage of pure air to the tire. The attachment of the flanged pump gear case to the seat on the side of the transmission casing provides at the same time a firm and simple mounting for the entire pump and a tight closure for the opening in the transmission case thereby preventing loss of lubricant.

When it is desired to operate the pump, it is merely necessary to swing the lever 66 thereby causing engagement of gears 58 and 62. If the motor of the vehicle is running and the usual clutch is engaged, the countershaft 51 will be rotated by means of the meshing gears 41 and 54, and the rotation of this shaft will be communicated to the pump through the gear train 57, 58 and 62.

Although a specific form of transmission has been described, it is obvious that the invention is not limited to the particular arrangement shown. Furthermore although a gear connection has been shown between the transmission counter shaft and the air pump, it is to be understood that other types of disconnectible drives might be employed.

Having thus described my invention what is claimed as new and desired to be secured by Letters Patent is:

1. In combination, a motor vehicle transmission casing formed with an opening in one side, a shaft in the transmission casing having a driven gear thereon mounted adjacent to said opening, a pump having a gear casing partitioned from the pump mechanism and secured to the transmission casing over said opening, a shaft mounted in the pump gear casing outside of the transmission casing and parallel with the shaft in the transmission casing, a gear slidingly mounted on said pump shaft and means for sliding said gear into and out of mesh with said gear in the transmission casing.

2. In combination, a motor vehicle transmission casing formed with an opening in one side thereof, a shaft in the transmission casing having a driven gear thereon mounted adjacent said opening, a pump secured to the casing over said opening and enclosing the same, a gear on the pump shaft adapted to be driven by the gear in the transmission casing, the opening in said casing being of greater horizontal width than the sum of the widths of the faces of said transmission and pump gears, and means for sliding one of said gears on its shaft into and out of mesh with the other gear.

3. In combination, a motor vehicle transmission casing formed with an opening in one side, a pump secured to the casing over said opening, a countershaft in the casing, a gear on the countershaft, a gear on the pump shaft wholly outside the casing, a gear extending through said opening and connecting the other gears, one of said gears being slidable into and out of driving position, and means to hold said slidable gear at either end of its movement.

4. An automobile tire pump comprising a crank case, a cylinder mounted thereon, a gear case attached thereto and separated therefrom by a transverse wall, a crank shaft, a piston in the cylinder operatively connected with the crank shaft, said pump adapted to be secured to the side of an automobile transmission case and said gear case having an open side adapted to be placed in communication with and receive the lubrication from said transmission case, a gear in said gear case slidably splined to said crank shaft and means for shifting said gear.

5. An automobile tire pump, adapted to be secured to the side of the transmission case of an automobile and be driven from one of the gears of the transmission gearing, comprising a pump gear-housing serving as the sole support for the pump and adapted to be secured to the side of the transmission case and over an opening therein, a pump crank-case partitioned from but secured to and supported by said gear-housing, a crank-shaft extending into said gear housing and said crank-case, a gear on said shaft arranged to be driven from one of the gears of the transmission gearing, a pump cylinder mounted on said crank-case and supported thereby, a piston within said cylinder, and a driving connection between said piston and said crank-shaft.

6. An automobile tire pump, adapted to be secured to the side of the transmission case of an automobile and be driven from one of the gears of the transmission gearing, comprising a pump gear-housing serving as the sole support for the pump and having an opening and adapted to be secured to the side of the transmission case with the openings in the gear-housing and the transmission case in alignment, a pump crank-case partitioned from but integral with and supported by said gear-housing and extending laterally therefrom, a crank shaft journaled in the pump gear-housing and crank-case and extending from said crank-case into said gear housing and located entirely without the transmission case, a gear on said shaft arranged to be driven from one of the gears of the transmission gearing, a pump cylinder mounted on said crank-case and supported thereby, a piston within said cylinder, and a driving connection between said piston and said crank-shaft.

7. In an automobile tire pump, adapted to be secured to the side of the transmission case of an automobile and be driven from one of the gears of the transmission gearing, a gear-housing and a crank case integral with one another and each having an opening, a partition between said gear-housing and said crank-case, a bearing in said partition, a crank-shaft journaled in said bearing and extending from said crank-case into said gear casing, a gear on said shaft and in said gear-housing arranged to be driven from one of the gears of the transmission gearing, a pump cylinder mounted on said crank-case and supported thereby, a piston within said cylinder and a driving connection between said piston and said crank-shaft.

8. In an automobile tire pump, adapted to be secured to the side of the transmission case of an automobile and be driven from one of the gears of the transmission gearing, comprising a pump gear-housing and a crank-case secured to one another but separated by a partition, a crank-shaft extending through said partition from said crank-case into said gear-housing, the gear-housing having a flanged opening in a plane parallel with said shaft, and said crank-case having an opening also parallel with said shaft but at an angle to the plane of the opening in said gear-housing, a gear on said shaft located in said gear-housing and arranged to be driven from one of the gears of the transmission gearing, a pump cylinder mounted on said crank-case and in alignment with the opening therein, a piston within said cylinder, and a driving connection between said piston and said crank-shaft.

9. In an automobile tire pump adapted to be secured to the side of the transmission case of an automobile and be driven from one of the gears of the transmission gearing, comprising a pump gear-housing and a crank-case secured to one another but separated by a partition, a crank-shaft extending from said crank-case through said partition into said gear-housing, the gear-housing having a flanged opening in a substantially vertical plane parallel with said shaft, and said crank-case having an opening in a substantially horizontal plane also parallel with said shaft, a gear on said shaft located in said gear-housing and arranged to be driven from one of the gears of the transmission gearing, a pump cylinder mounted on said crank-case and in alignment with the opening therein, the axis of the pump cylinder being substantially vertical, a piston within said cylinder, and a driving connection between said piston and said crank-shaft.

10. In an automobile driven tire pump, a gear-housing and crank-case secured to but partitioned from one another, the gear-housing having an open side for attachment of an automobile gear case and communication with an opening in the side thereof and the crank-case having an open top for the reception of a pump cylinder.

11. In an automobile driven tire pump, a gear-housing and a crank-case secured to one another but separated by a partition, a pump shaft bearing in said partition, the gear-housing having a flanged opening in a plane parallel with the axis of said bearing, and said crank-case having an opening also parallel with the axis of said bearing but at an angle to the plane of the opening in said gear-housing.

12. In an automobile driven tire pump, a gear-housing and a crank-case secured to one another but separated by a partition, a pump shaft bearing in said partition, the gear-housing having a flanged opening in a plane parallel with the axis of said bearing, but at substantially right angles to the plane of the opening in said gear-housing.

13. In combination, a motor vehicle transmission casing, formed with an opening therein, a driven gear mounted in said casing adjacent said opening, a pump having a gear casing partitioned from the pump mechanism and secured to the transmission casing over said opening, a pump shaft mounted in the pump gear casing, a driving connection between said shaft and said gear, and means for rendering said driving connection operative and inoperative.

14. In combination, a motor vehicle transmission casing formed with an opening therein, a driven gear mounted in said casing adjacent said opening, a pump having a gear casing partitioned from the pump mechanism and secured to the transmission casing over said opening, a pump shaft mounted in the pump gear casing, and a driving connection between said pump shaft and said driven gear including a gear adapted to be moved into and out of mesh with said driven gear.

In testimony whereof I affix my signature.

JESSE G. VINCENT.